(12) United States Patent
Hibi et al.

(10) Patent No.: US 7,040,766 B2
(45) Date of Patent: May 9, 2006

(54) ILLUMINATION OPTICAL SYSTEM AND PROJECTION-TYPE DISPLAY APPARATUS

(75) Inventors: Taketoshi Hibi, Tokyo (JP); Shinji Okamori, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 59 days.

(21) Appl. No.: 10/751,642

(22) Filed: Jan. 6, 2004

(65) Prior Publication Data
US 2004/0141161 A1 Jul. 22, 2004

(30) Foreign Application Priority Data
Jan. 7, 2003 (JP) .............................. 2003-000857

(51) Int. Cl.
G03B 21/28 (2006.01)
G02F 1/1335 (2006.01)

(52) U.S. Cl. ............................. 353/99; 353/20; 353/31; 353/37; 353/84; 353/90; 349/9

(58) Field of Classification Search .................. 353/99, 353/98, 102, 37, 85, 88, 89, 90, 20, 31, 84; 349/9, 67
See application file for complete search history.

(56) References Cited

U.S. PATENT DOCUMENTS

| | | | |
|---|---|---|---|
| 5,098,184 A | 3/1992 | van den Brandt et al. .. | 353/102 |
| 5,410,370 A | 4/1995 | Janssen ....................... | 348/756 |
| 5,416,514 A | 5/1995 | Janssen et al. .............. | 348/196 |
| 5,508,738 A | 4/1996 | Janssen et al. .............. | 348/196 |
| 5,528,318 A | 6/1996 | Janssen ....................... | 348/756 |
| 5,532,763 A | 7/1996 | Janssen et al. .............. | 348/744 |
| 5,548,347 A | 8/1996 | Melnik et al. .............. | 348/761 |
| 5,597,223 A * | 1/1997 | Watanabe et al. ............. | 353/97 |
| 5,608,467 A | 3/1997 | Janssen et al. .............. | 348/744 |
| 5,634,704 A | 6/1997 | Shikama et al. .............. | 353/31 |
| 5,833,341 A * | 11/1998 | Kimura et al. ................ | 353/98 |
| 5,864,374 A * | 1/1999 | Ito et al. ..................... | 348/757 |
| 6,208,463 B1* | 3/2001 | Hansen et al. .............. | 359/486 |

(Continued)

FOREIGN PATENT DOCUMENTS

JP 63-121821 A 5/1988

(Continued)

OTHER PUBLICATIONS

Bierhuizen, "Single Panel Color Sequential Projectors with Polarization Recovery", SID 02 Digest-55.1, p. 1350-1353.

Primary Examiner—W. B. Perkey
Assistant Examiner—Rochelle Blackman
(74) Attorney, Agent, or Firm—Birch Stewart Kolasch & Birch LLP

(57) ABSTRACT

The illumination optical system for guiding a light emitted from a light source to an object to be illuminated along an optical path includes a first reflecting mirror reflecting a part of a light which is moving in a forward direction along the optical path to move away from the light source and a second reflecting mirror reflecting a part of a light which is reflected from the first reflecting mirror and moving in a reverse direction along the optical path to approach the light source. The first reflecting mirror has an opening facing a light-entering surface of the object to be illuminated, and the second reflecting mirror has a window that allows the light emitted from the light source to pass therethrough, whereby an optical cavity is constituted by the first and second reflecting mirrors.

18 Claims, 11 Drawing Sheets

U.S. PATENT DOCUMENTS

| | | | |
|---|---|---|---|
| 6,356,700 B1 * | 3/2002 | Strobl | 385/147 |
| 6,416,182 B1 * | 7/2002 | Kakuda et al. | 353/20 |
| 2001/0008470 A1 | 7/2001 | Dewald | 359/850 |
| 2002/0135862 A1 | 9/2002 | Dewald | 359/298 |
| 2002/0176255 A1 | 11/2002 | Yamauchi et al. | |
| 2002/0180937 A1 | 12/2002 | De Vaan et al. | |

FOREIGN PATENT DOCUMENTS

| | | |
|---|---|---|
| JP | 3-111806 A | 5/1991 |
| JP | 4-316296 A | 11/1992 |
| JP | 7-98479 A | 4/1995 |
| JP | 2000-284229 A | 10/2000 |

* cited by examiner

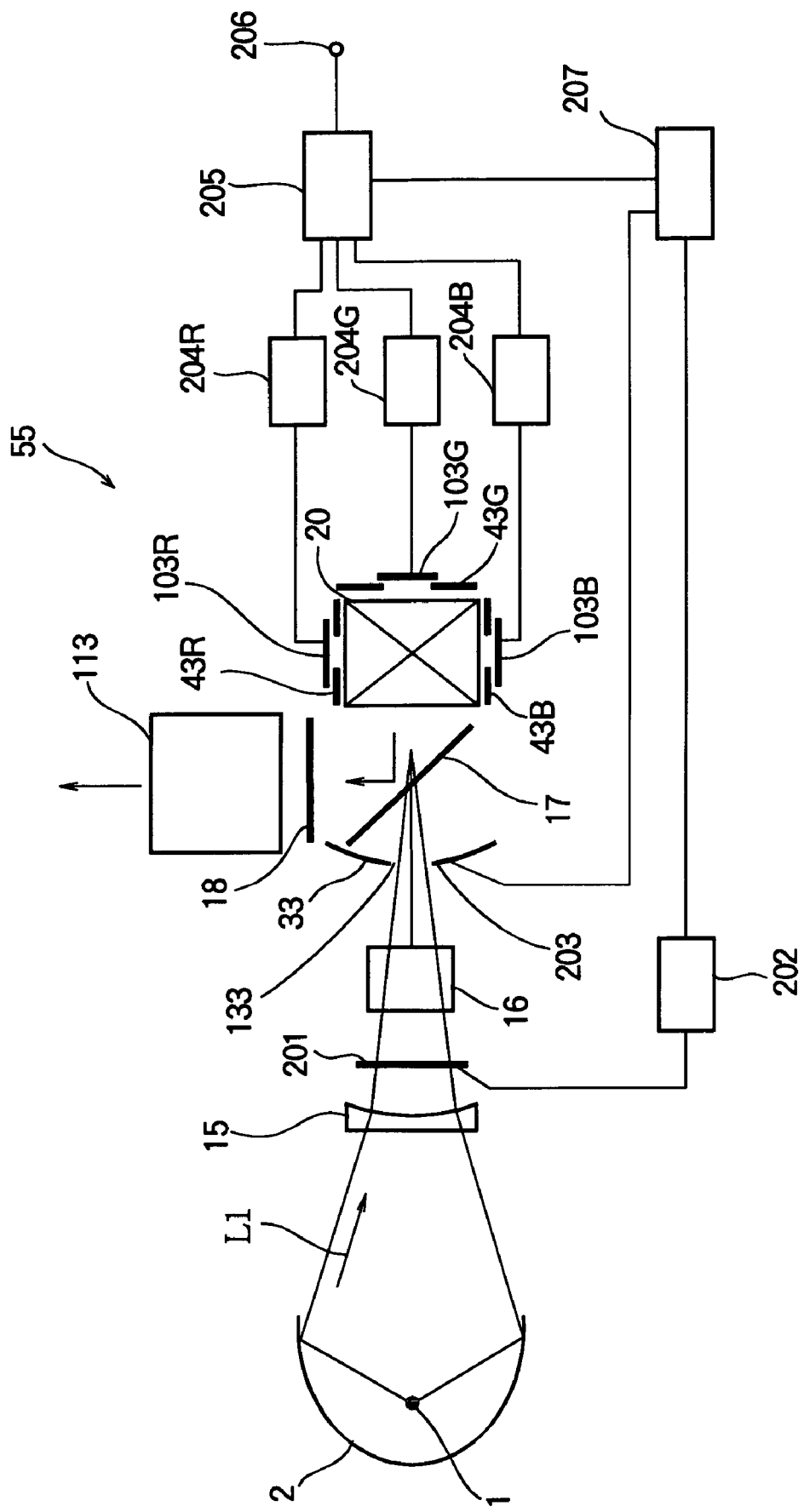

ILLUMINATION OPTICAL SYSTEM AND PROJECTION-TYPE DISPLAY APPARATUS

This Nonprovisional application claims priority under 35 U.S.C. § 119(a) on Patent Application No(s). 2003-000857 filed in JAPAN on Jan. 7, 2003, the entire contents of which are hereby incorporated by reference.

BACKGROUND OF THE INVENTION

1. Field of the Invention

The present invention relates to an illumination optical system for guiding the light emitted from a light source to a light valve for forming an image, and a projection-type display apparatus having such an illumination optical system.

2. Description of Related Art

In the projection-type display apparatus, the illumination optical system thereof having capability of condensing and transmitting incoming light converts the light emitted from the light source into a light beam having uniform luminance distribution within its cross section with which the light valve thereof is illuminated. The light source may be a very-high pressure mercury lamp. The divergent light from the lamp is converted into collimated or convergent light by a concave mirror disposed near the lamp, and enters the illumination optical system. The light emitted from the lamp has, when condensed, a rotational-symmetry luminance distribution in which the luminance increases toward the center portion within its cross section normal to the optical axis. Such a luminance distribution is not suitable for illuminating the light valve, and it is therefore converted into a light beam that has a rectangular cross section and is uniform in luminance within the rectangular cross section.

One of methods for obtaining such an illuminating light beam uses a columnar optical device as an optical integrator. In this method, the light from the lamp is condensed, and enters the columnar optical device (a glass prism or a hollow-body mirror) at one end thereof within which it reflects several times to be uniformalized and exits from the other end as a uniform illuminating light beam rectangular in cross section (for example, refer to Patent document 1).

Another method uses two lens arrays. In this method, images of contours of rectangular lenses of a first lens array are formed on the input side of a light valve by use of lenses of a second lens array. This method provides a uniform illuminating light beam rectangular in cross section by integrating light beams exiting from a number of lenses of the first lens array (for example, refer to Patent Document 2).

When the light valve is a liquid crystal device, unidirectionally polarized light is used as the illuminating light beam. Since the lamp as the light source emits polarized lights having different polarization directions, if a polarized light having a first polarization direction is to be used for illuminating the light valve, it is necessary to convert a polarized light having a second polarization direction perpendicular to the first polarization direction into the polarized light having the first polarization direction to improve utilization efficiency of the light.

Methods for performing such polarization conversion includes the one that utilizes the columnar optical device (for example, refer to Patent Document 3), the one that utilizes he lens arrays (for example, refer to Patent Document 4), and the one that uses a polarization-separation prism, a phase plate and a mirror (for example, refer to Patent Document 5).

For providing a smaller and less expensive projection-type display device, it is desirable that the number of the light valves used is small. An apparatus that can project a full color image by use of a single light valve is known (for example, refer to FIG. 2 of Non-patent Document 1). This apparatus has a color wheel for performing color-switching among three primary colors. However, the utilization efficiency of the light emitted from the lamp is low, since an image is formed by one of the three primary colors at a time, and the lights of the other two of the three primary colors are therefore discarded. On that account, it has been proposed to illuminate a single light valve with two or more primary colors at a time to improve utilization efficiency of the light (for example, refer to Patent Document 6, Patent Document 7, and FIG. 9 of Non-Patent Document 1).

Patent Document 1: Japanese Patent Application Laid-Open No.: 07-98479 (FIG. 2)
Patent Document 2: Japanese Patent Application Laid-Open No. 03-111806 (FIG. 3)
Patent Document 3: U.S. Patent Application Publication No.: US2001/0008470 A1 (FIG. 9)
Patent Document 4: Japanese Patent Application Laid-Open No.: 2000-284229 (FIG. 1)
Patent Document 5: Japanese Patent Application Laid-Open No.: 63-121821 (FIG. 1)
Patent Document 6: Japanese Patent Application Laid-Open No.: 04-316296 (FIG. 1)
Patent Document 7: U.S. Patent Application Publication No.: US2002/0135862 A1 (FIG. 6)
Non Patent Document 1: Serge Bierhuizen, Single Panel Color Sequential Projectors with Polarization Recovery, SID'02 Digest-55.5 (FIG. 2 and FIG. 9)

However, the above-described conventional illumination optical systems have problems described below. In the case of using a columnar optical device as a light integrator, the columnar optical device has to be long enough, otherwise a sufficiently uniform illuminating light beam cannot be obtained.

In the case of using two lens arrays as an optical integrator, each of the lens arrays must have a large cross-sectional area, and a long distance must be put between them. As a result, the display apparatus becomes large in size.

In the case of utilizing the columnar optical device for performing the polarization conversion, the columnar optical device must have an aperture formed in its light-entrance surface. This gives rise to a loss when the light emitted from the lamp enters the columnar optical device. In the case of disposing a strip-like conversion prism in the rear of the lens array for performing the polarization conversion, it is difficult to manufacture the display apparatus at low cost since the strip-like conversion prism has a complicated structure and is expensive. In the case of using a polarization-separation prism, a phase plate, and a mirror is used to perform the polarization conversion, the display increases in weight and becomes complicated in structure.

In the case of using a color wheel for displaying a full-color image by use of a single light valve, the utilization efficiency of the light is low. In the case of using a rotatable prism for displaying a full-color image by use of a single light valve, the display apparatus becomes large in size and becomes complicated in structure. In the case of using a BMF (Band Modulation Filter) switch for displaying a full-color image by use of a single light valve, it is difficult for the display apparatus to have sufficiently long lifespan.

In the case of using a color wheel having color segments arranged spirally for displaying a full-color image by use of a single light valve, a light loss is caused since a columnar optical device having an aperture at its light-entrance surface has to be used for recapturing the lights reflected from the color segments. In addition, there is a problem that a slight displacement of the light source causes a substantial reduction of brightness of a projected image.

Furthermore, the conventional illumination optical systems in which reflective optical devices such as a reflective light switch, a dichroic mirror, a reflective polarization-separation device, and a reflective light valve are set such that their entrance surfaces are at right angles with the optical axis have a problem that the lights reflected from such reflective optical devices travel in the opposite direction towards the lamp, and part of the lights that have returned to the lamp causes the temperature of a lamp electrode to rise thereby shortening the lifespan of the lamp.

SUMMARY OF THE INVENTION

The present invention has been made to remove such problems with an object to provide an illumination optical system with light-integrating capability which is small in size and simple in structure. Another object of the present invention is to provide an illumination optical system that can reuse the lights reflected form the reflective optical devices without returning them to the light source. Still another object of the present invention is to provide a compact and less expensive projection-type display apparatus that can project a brighter image.

The object is achieved by an illumination optical system for guiding a light emitted from a light source to an object to be illuminated along an optical path comprising:

a first reflecting mirror reflecting a part of a light which is moving in a forward direction along the optical path to move away from the light source; and a second reflecting mirror reflecting a part of a light which is reflected from the first reflecting mirror and moving in a reverse direction along the optical path to approach the light source;

wherein the first reflecting mirror has an opening facing a light-entering surface of the object to be illuminated and the second reflecting mirror has a window that allows the light emitted form the light source to pass therethrough, whereby an optical cavity is constituted by the first and second reflecting mirrors.

BRIEF DESCRIPTION OF THE DRAWINGS

FIG. 12 shows a structure of a projection-type display apparatus according to embodiment 5 of the invention.

DESCRIPTION OF THE PREFERRED EMBODIMENTS

Embodiment 1

Figure 1:
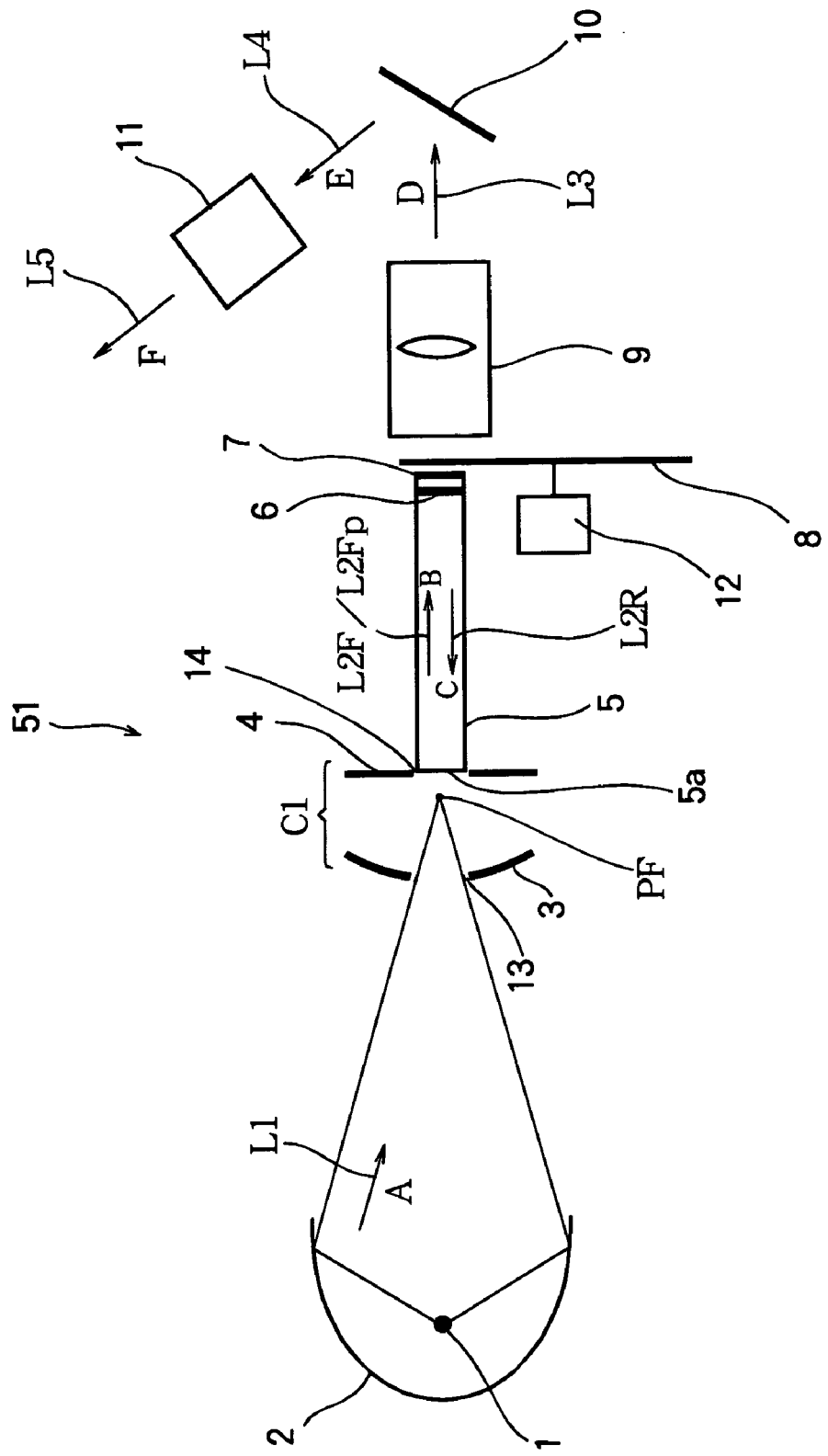
FIG. 1 shows a structure of an illumination optical system according to embodiment 1 of the invention.

FIG. 1 shows a structure of an illumination optical system 51 according to embodiment 1 of the invention.

The illumination optical system 51 has a lamp 1 as a light source, and a lamp-side reflecting mirror 2 as a light collecting means disposed near the lamp 1. A second reflecting mirror 3, a first reflecting mirror 4, a columnar optical device 5, a quarter wave plate 6 as a phase plate, a reflective polarization-separation device 7, a color wheel 8, an optical relay device 9, a light valve 10, and a projection lens 11 are disposed in this order from the lamp 1 along an optical path of the light reflected from the lamp-side reflecting mirror 2.

The arrow A denotes a direction of movement of the light L1 reflected from the lamp-side reflecting mirror 2, the arrow B denotes a direction of movement of the light L2F within the columnar optical device 5, and the arrow C denotes a direction of movement of the light L2R within the columnar optical device 5 opposite to the direction of movement of the light L2F. The arrow D denotes a direction of movement of the light L3 entering the light valve 10, the arrow E denotes a direction of movement of the light L4 exiting form the light valve 10, and the arrow F denotes a direction of movement of the light L5 exiting from the projection lens 11 and going toward a not illustrated screen. C1 denotes an optical cavity (resonator) formed by the first reflecting mirror 4 and the second reflecting mirror 3 opposed to each other, and PF denotes a convergence point at which the light emitted from the lamp 1 converges.

For ease of explanation, if the light emitted from the lamp 1 moves away from the lamp 1, it is described as moving in "the forward direction", while if it approaches the lamp 1, it is described as moving in "the reverse direction" hereinafter.

An overall operation of the illumination optical system having the above-described structure is explained below. The light diverging from the lamp 1 changes direction when reflected by the lamp-side reflecting mirror 2 to make the converging light L1. The converging light L1 passes through a window 13 formed in the center of the second reflecting mirror 3 and the convergence point PF, and reaches the first reflecting mirror 4. A part of the light that has reached the first reflecting mirror 4 enters the columnar optical device 5 from its entrance surface 5a and moves in the forward direction. The other part is reflected there and moves in the reverse direction toward the second reflecting mirror 3. The first reflecting mirror 4 and the second reflecting mirror 3 reflect the light between them repeatedly until it goes into the entrance surface 5*a* of the columnar optical device 5. Accordingly, the entrance surface 5*a* of the columnar optical device 5 is illuminated more uniformly than it is illuminated without the optical cavity C1.

The structure and the operation of the optical cavity C1 will be explained in more detail with reference to FIGS. 2 and 3.

Figure 2:
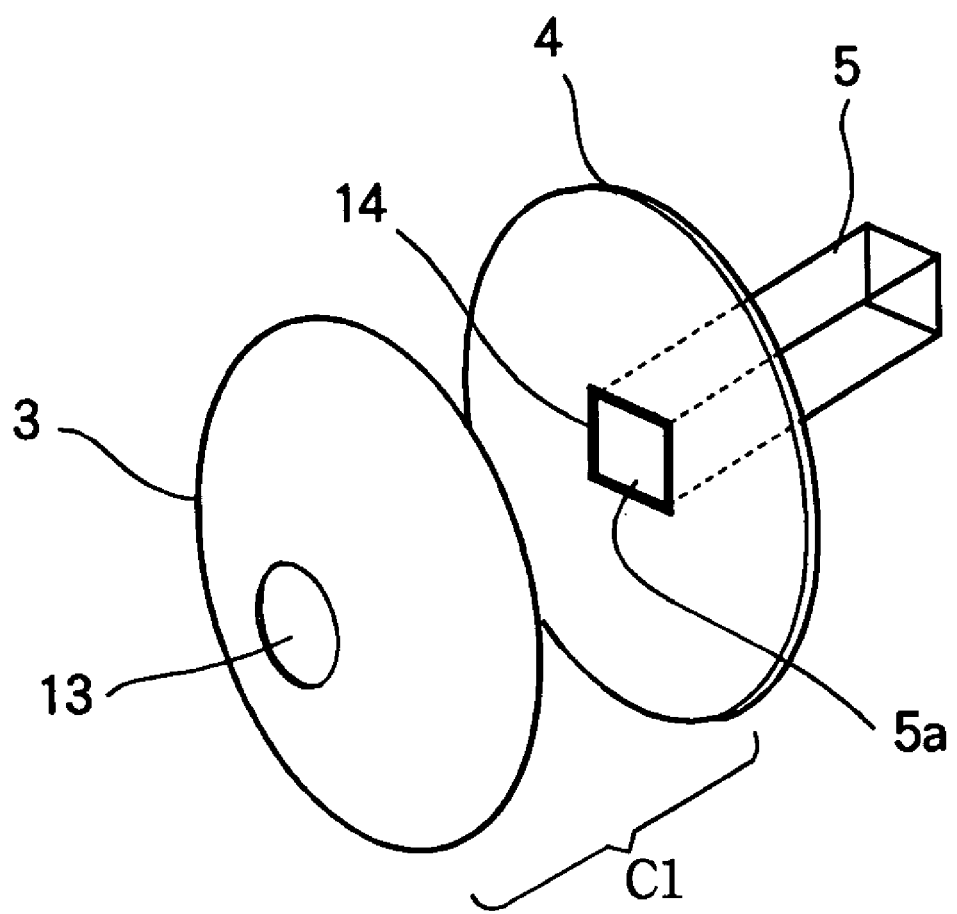
FIG. 2 is a perspective view of an optical cavity C1 of the illumination optical system shown in FIG. 1 which is formed by a second reflecting mirror 3 and a first reflecting mirror 4.

FIG. 2 is a perspective view of the optical cavity C1 formed by the second reflecting mirror 3 and the first reflecting mirror 4. As shown in FIG. 2, the second reflecting mirror 3 has the window 13 formed approximately in the center portion thereof that allows the light moving in the forward direction to pass, and the first reflecting mirror 4 has an opening 14 formed approximately in the center portion thereof facing the entrance surface 5*a* of the columnar optical device 5. The light that has reached a portion of the first reflecting mirror 4 surrounding the opening 14 is reflected there and moves toward the second reflecting mirror 3.

Figure 3A:
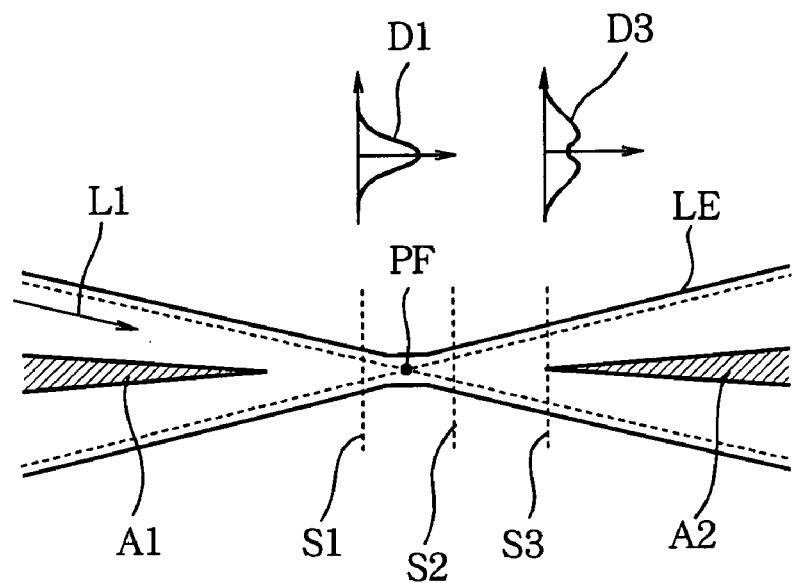
FIG. 3a shows light distribution around a convergence point PF when the optical cavity C1 is not provided.
Figure 3B:
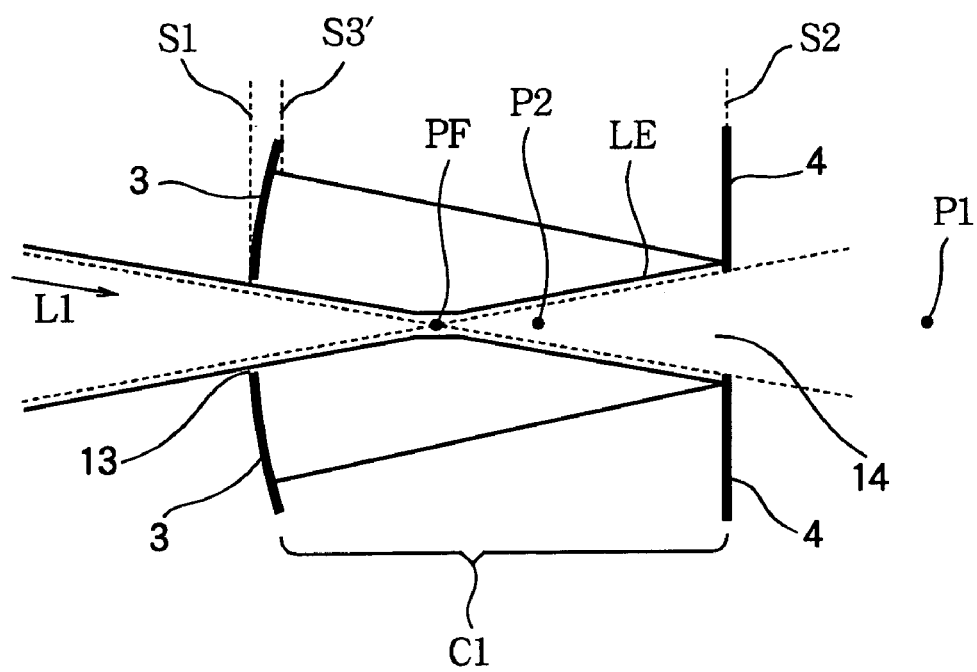
FIG. 3b shows light distribution around the convergence point PF when the optical cavity C1 is provided.

The workings of the optical cavity C1 will be explained with reference to FIGS. 3*a* and 3*b*. FIG. 3*a* shows a light distribution around the convergence point PF in a case where the optical cavity C1 is not provided. FIG. 3*b* shows a light distribution around the convergence point PF in a case where the optical cavity C1 is provided.

As shown in FIG. 3*a*, if the optical cavity C1 is not provided, shadows A1 and A2 occur in front and in the rear of the convergence point PF due to a lamp electrode (not illustrated) or the like within an envelope LE of the light moving in the forward direction. In FIG. 3*a*, S1 and S2 denote positions in which the second reflecting mirror 3 and the first reflecting mirror 4 are set respectively if the optical cavity C1 is provided, and S3 denotes a position distant from the position S2 by a value equal to the interval between the point S1 and the point S2. If the second reflecting mirror 3 and the first reflecting mirror 4 are set in these positions, the light which is reflected by the first reflecting mirror 4 and reaches the second reflecting mirror 3 has an expansion (diameter) which is same as the expansion of the light moving in the forward direction at the position S3 shown in FIG. 3*a*. D1 and D3 show luminance distributions in the direction orthogonal to the optical axis at the positions S1 and S3 respectively.

In FIG. 3*b*, S3' denotes a position of a portion of the second reflecting mirror 3 at which an outermost part of the light reflected from the first reflecting mirror 4 is reflected. P1 in FIG. 3*b* denotes a focal point of the second reflecting mirror 3 which is a spherical mirror. P2 in FIG. 3*b* denotes a point which is plane-symmetrical to the focal point P1 with respect to a plane which includes the position S2 and is perpendicular to the optical axis. The lamp 1 is not an ideal point-source of light, and the reflective surface of the lamp-side reflecting mirror 2 has slight bumps, dips and distortions. Accordingly, the envelope LE of the light L1 has some diameter even at the convergence point PF, and the light L1 has a bell-shaped luminance distribution D1 even in the position S1 having a bulging portion at its center.

The cross section area of the light L1 decreases as it moves in the forward direction, and becomes smallest around the convergence point PF. As the light L1 moves further toward the position S2, its cross section area increases, and it has the luminance distribution D3 having a depressed portion at its center. The positions S1, S2 and S3 are evenly spaced. If a concave mirror is set in the position S1, and a plane mirror is set in the position S2, the light reflected from the plane mirror has a luminance distribution at the concave mirror that is the same as the luminance distribution D3 in the position S3.

The distribution D1 has a bulging portion at its center, and the distribution D3 has a depressed portion at its center. Accordingly, by forming the small circular window 13 in the center of the second reflecting mirror 3 to let the light L1 pass therethrough, the second reflecting mirror 3 can reflect most of the light reflected from the first reflecting mirror 4 back to the first reflecting mirror 4. In consequence, the optical cavity C1 can take in the light L1 efficiently.

In order to enable the optical cavity C1 not to lose the light taken in, it is necessary to properly determine the shapes and arrangement of the first reflecting mirror 4 and the second reflecting mirror 3.

According to the stability diagram of the optical cavity described in "The use and hints of lasers" p. 23–27, FIG. 2-2 written by Yuukichi Otake and published by Optronics Co., Jun. 1, 2000, a cross between a parallel-plane arrangement and a confocal arrangement exhibits wide and stable operating range. Accordingly, if such a cross is used for the arrangement of the optical cavity, the stability of the optical cavity is not much affected by dispersion of the shape of the lamp-side reflecting mirror 2 and divergence of the light L1 along the forward direction.

Figure 4A:
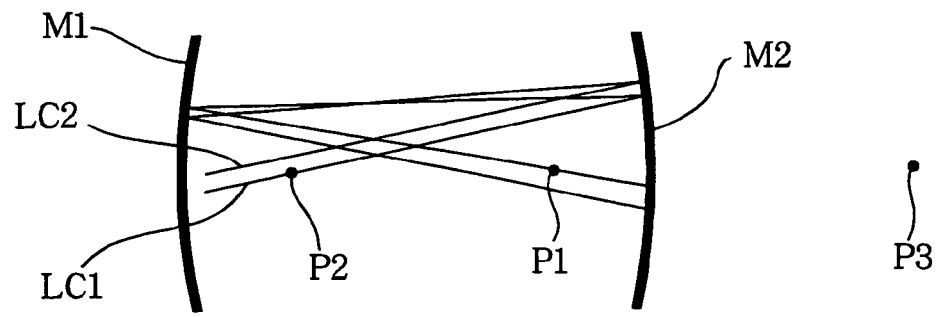
FIGS. 4a, 4b, and 4c are explanatory views explaining how the optical cavity takes in the light moving in the forward direction.

Explanation will be given as to how such an optical cavity takes in the light moving in the forward direction with reference to FIGS. 4*a* to 4*c*. FIG. 4*a* shows an optical cavity that is a cross between a parallel-plane type cavity and a confocal type cavity. In this figure, M1 and M2 denote spherical reflecting mirrors, P1 and P2 denote focal points of the reflecting mirrors M1 and M2, and P3 denotes a center of curvature of the reflecting mirror M1. The focal point P1 is at the midpoint between the reflecting mirror M1 and the point P3. The light LC1 that has passed through the focal point P2 is reflected by the reflecting mirror M2, moves along a direction parallel to the optical axis, and reaches the reflecting mirror M1 to be reflected there. The light LC1 reflected from the reflecting mirror M1 passes through the focal point P1.

The light LC1 repeats such reflection between the reflecting mirrors M1 and M2, thereby being confined stably within the optical cavity. The light LC2 that has passed slightly above the focal point P2 passes slightly below the focal point P1 after being reflected by the reflecting mirrors M2 and M1. Accordingly, by bringing the convergence point PF of the light L1 (FIG. 3) close to the focal point P2, a conjugate image at the convergence point PF can be formed near the focal point P1.

The conventional optical integrator comprised of a columnar optical device and lens arrays achieves uniformly illuminating a light valve by forming a plurality of images of a light source on a plane orthogonal to the optical axis. On the other hand, the optical cavity used as the optical integrator achieves uniformly illuminating a light valve by forming a plurality of images of a light source on the optical axis.

In consideration of the fact that most optical devices to be illuminated have a flat entrance surface and the fact that the optical cavity must have a window to take in the light from the lamp, it is desirable that the reflecting mirror M2 is a plane mirror. By setting a plane reflecting mirror M3 at the midpoint between the reflecting mirrors M1 and M2 of the optical cavity shown in FIG. 4*a*, and replacing the reflecting mirror M1 with the second reflecting mirror 3 having the window formed in the center thereof, an optical cavity shown in FIG. 4*b* can be obtained.

Figure 4B:
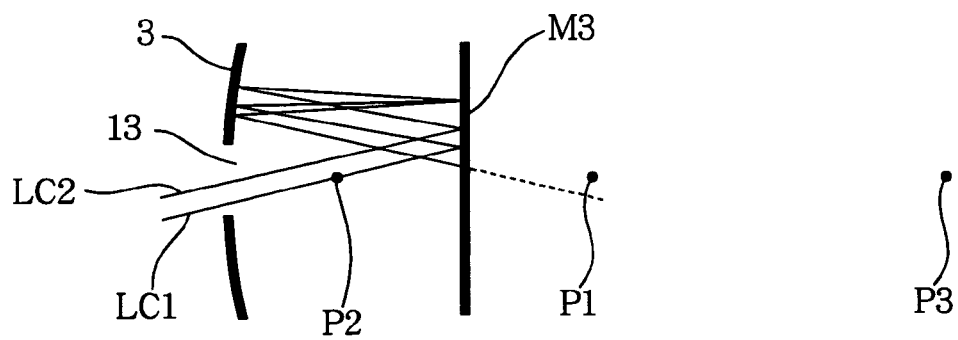
Figure 4C:
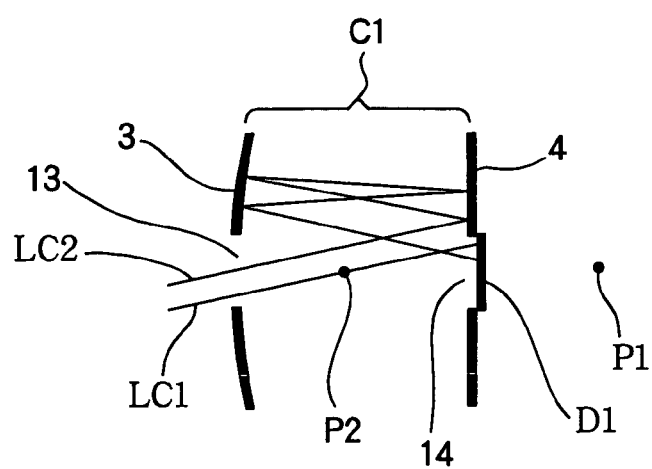

By replacing the reflecting mirror M3 of the cavity shown in FIG. 4b with the first reflecting mirror 4 having the opening 14 in the shape of a contour of an object to be illuminated at its center, the optical cavity C1 shown in FIG. 4c can be obtained. In this figure, D1 denotes a light-entrance surface of an object to be illuminated such as the columnar optical device 5 shown in FIG. 1. In the optical cavity shown in FIG. 4c, it is possible for the light LC1 to directly illuminate the entrance surface D1 of the object to be illuminated, and for the light LC2 to illuminate the entrance surface D1 after being reflected four times within the optical cavity C1, if the light from the lamp is converged near the focal point P2 with an appropriate F-number (diameter).

If the object to be illuminated is an refractive optical device or a device involving the light moving in the backward direction, a part of the light LC1 that has been reflected off the entrance surface D1 of the object re-illuminate the entrance surface D1 after being reflected several times within the optical cavity C1. In the illumination optical system 51 shown in FIG. 1, the entrance surface 5a of the columnar optical device 5 corresponds to the above-described entrance surface D1, and the output surface of the columnar optical device 5 is provided with the quarter wave plate 6 and the reflective polarization-separation device 7. Accordingly, the light L2R reflected from the polarization-separation device 7 moves in the reverse direction within the columnar optical device 5.

Figure 5A:
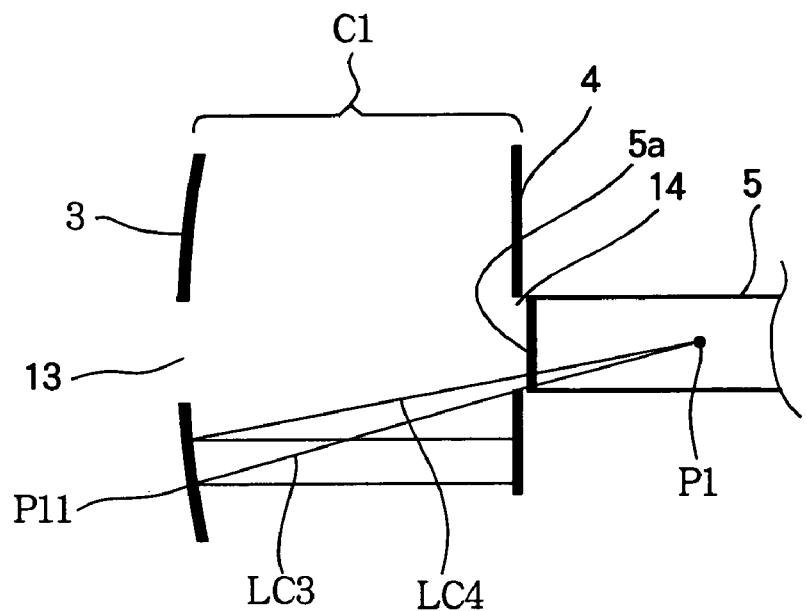
FIGS. 5a and 5b are explanatory views explaining how the optical cavity takes in the light moving in the reverse direction and reflects it as the light moving in the forward direction.
Figure 5B:
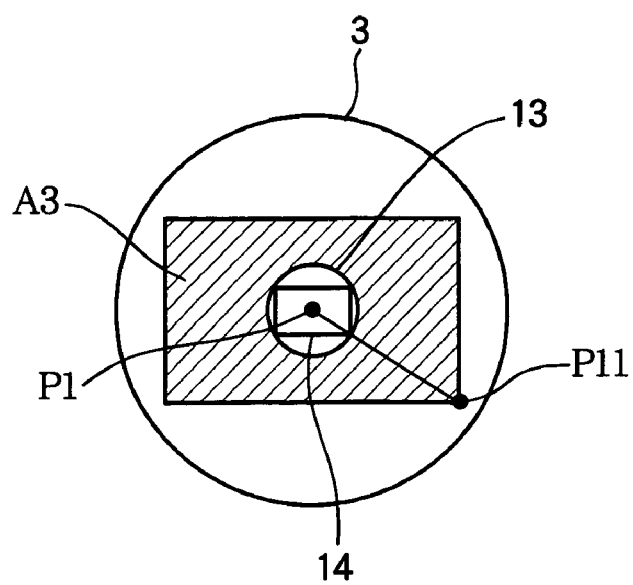

Explanation will be made as to how the optical cavity C1 takes in the light moving in the reverse direction and reflects it so that it moves in the forward direction with reference to FIGS. 5a and 5b. FIG. 5a shows a part of the illumination optical system 51 in which the optical cavity C1 is connected with the columnar optical device 5. FIG. 5b shows this part viewed from the lamp 1.

In FIG. 5a, LC3 and LC4 denote the lights passing through the focal point P1, and P11 denotes a reflection point on the surface of the second reflecting mirror 3 at which the light LC3 is reflected. In FIG. 5b, A3 denotes a reflection zone on the surface of the second reflecting mirror 3 where the light moving in the reverse direction is reflected.

As shown in FIG. 5a, when the light LC3, which makes the largest angle with the optical axis of all the lights moving in the reverse direction and passing through the focal point P1, passes through the focal point P1, the second reflecting mirror 3 reflects the light LC3 at the reflection point P11 toward the first reflecting mirror 4 which reflects the light LC3 nearly perpendicularly. Consequently, the light LC3 is reflected off the reflection point P11 again to make a light that passes through the focal point P1 and moves in the forward direction. The light LC4 that makes a smaller angle with the optical axis than the light LC3 also makes a light that passes through the focal point P1 and moves in the forward direction as with the light LC3.

Since the columnar optical device 5 serves as an optical integrator, the light moving in the reverse direction within the columnar optical device 5 has uniform luminance distribution at the opening 14. Since the reflection zone A3 of the second reflecting mirror 3 reflects the light moving in the reverse direction, when the ratio of the area of the window 13 to the area of the zone A3 is defined as R, the intensity of the light returning to the lamp can be reduced to R×100% by reducing the value of R. In order to take in the light from the lamp 1 without loss, it is desirable to place the window 13 in the close vicinity of the convergence point PF at which the light from the lamp 1 converges, and make the size of the window slightly larger than the size of the light spot at the convergence point PF.

As explained above, the optical cavity C1 takes in the light emitted from the lamp 1, uniformalizes this light by reflecting it multiple times therein, and then illuminates the entrance surface 5a of the columnar optical device 5 which is an object to be illuminated with the uniformalized light. The columnar optical device 5 converts the light L2F moving in the forward direction that has entered from the entrance surface 5a to the light which is more uniform in intensity and has a rectangular cross section by reflecting it multiple times. The number of time that the light L2F reflects within the columnar optical device 5 can be as small as three or less on the strength of the effect of uniformalization produced by the optical cavity C1. Accordingly, the length of the columnar optical device 5 can be shorter than was previously possible.

The light L2F passes through the quarter wave plate 6. The reflective polarization-separation device 7 disposed at the back of the quarter wave plate 6, upon receiving the light L2F, allows a polarized light having a first polarization direction to pass and reflects a polarized light having a second polarization direction perpendicular to the first polarization direction as the light L2R. The light L2R reflected from the polarization-separation device 7 passes through the quarter wave plate 6, and moves in the reverse direction or the direction shown by the arrow C within the columnar optical device 5. Approximately (1−R)×100% of the light L2R is reflected to make a polarized light L2Fp moving in the forward direction or the direction shown by the arrow B. The light L2Fp passes through the quarter wave plate 6. Thus, the polarized light reflected from polarization-separation device 7 passes through the quarter wave plate 6 twice. Accordingly, the polarization direction of the light L2Fp is shifted from that of the light L2R by 90 degrees, so the light L2Fp can pass through the polarization-separation device 7.

The light that has passed through the polarization-separation device 7 reaches a color wheel 8 which a motor 12 rotates at a predetermined rotation speed. The color wheel 8 has sectoral segments each of which forms a dichroic filter allowing one of red, green and blue lights. An optical relay system 9 guides the light exiting from the color wheel 8 changing in color among red, green, and blue in a predetermined sequence to the light valve 10. Thus, the light valve 10 is irradiate with a polarized light L3 exiting from the optical relay system 9 and moving in the direction shown by the arrow D as shown in FIG. 1.

The light valve 10 is a reflective liquid-crystal device having a number of cells each of which reflects a corresponding part of the polarized light L3 shifting its polarization direction by a value according to a value of a signal supplied. The light reflected from the light valve 10 enters an analyzer (not shown) or a polarization-separation prism (not shown) to make a light L4 moving in the direction shown by the arrow E. The light L4 which represents an image as light and dark patterns enters the projection lens 11 to be thrown onto a screen (not shown) as a projection light L5. As explained above, it is possible to project a full-color image by color-switching basis by use of one light valve 10.

The color segment of the color wheel 8 does not necessary have to be sectoral. The segments may be arranged spirally so that the same light valve can be irradiated with two or three different color lights at a time. Furthermore, it is possible to provide the color wheel 8 with density segments in addition to the color segments. If transparent, semitransparent, or total-reflection segments are provided, it becomes possible to project a brighter image, to increase the number of gradation levels, or to make an image brighter during a specific period for each video frame, whereby blurring of an image of a moving object can be eased.

Furthermore, the light valve does not necessarily have to be a reflective liquid-crystal device. For example, it may be a micro mirror device. In this case, the quarter wave plate 6 and the reflective polarization-separation device 7 can be eliminated since the illuminating light L3 can be a natural light.

It has been found through computer simulation on the effect of the optical cavity that the light-condensing efficiency is improved by 10% or more with the F-number being greater than 1, and an object to be illuminated can be illuminated uniformly with low loss of light in an illumination optical system where the light emitted from Philips make UHP-type lamp having an arc length of 1.3 mm is collected and input into a columnar optical device whose entrance surface has a size of 6 mm×3 mm, if the optical cavity having the structure described above is used. Furthermore, on the strength of the effect of the optical cavity, the columnar optical device 5 can be made shorter than was previously possible, whereby the projection-type display apparatus can be made smaller in size.

Embodiment 2

Figure 6:
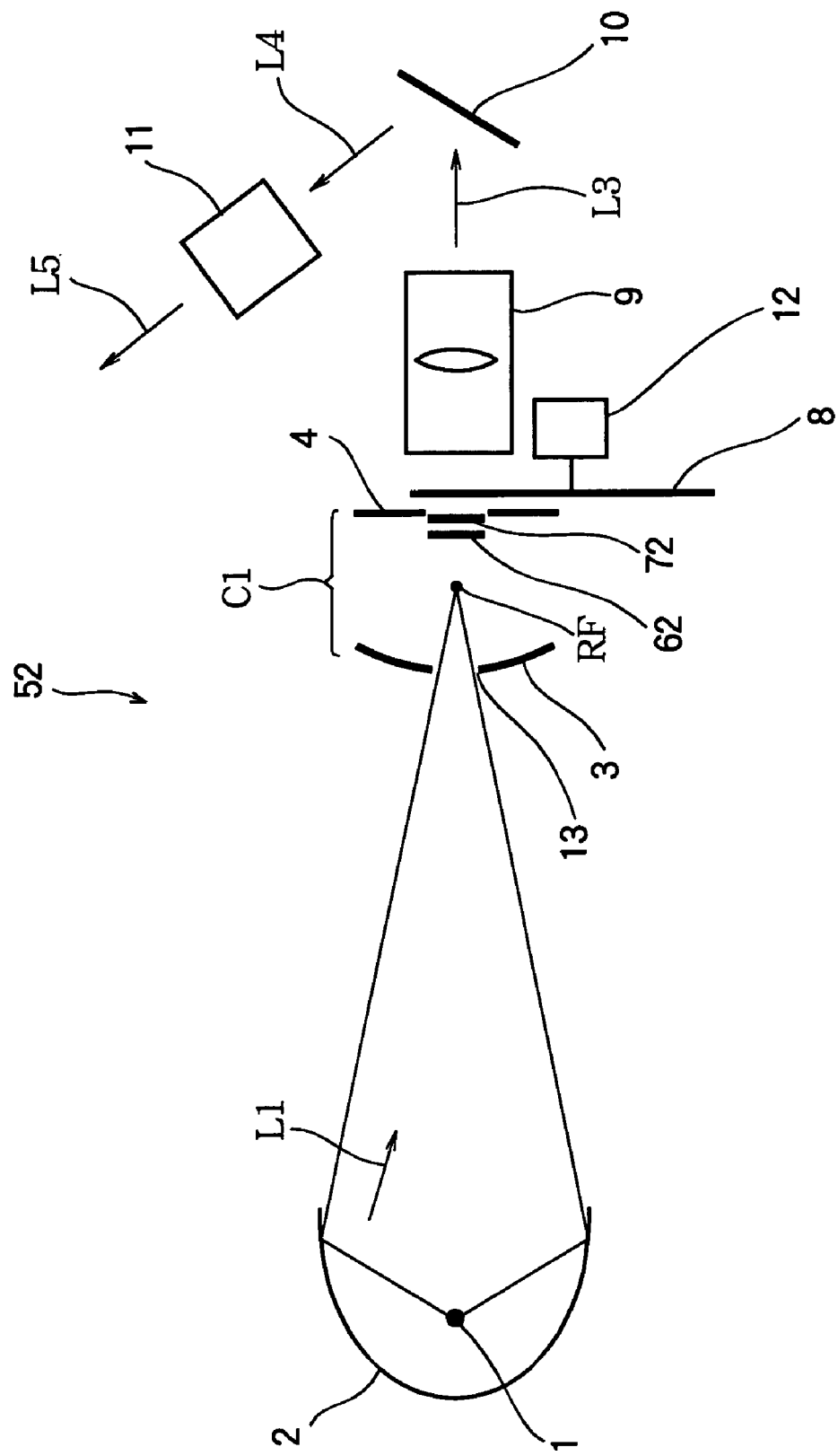
FIG. 6 shows a structure of an illumination optical system according to embodiment 2 of the invention.

FIG. 6 shows a structure of an illumination optical system 52 according to embodiment 2 of the present invention.

The illumination optical system 52 according to embodiment 2 is different from the illumination optical system 51 according to embodiment 1 in that the columnar optical device 5 is removed, and the quarter wave plate 6 and the reflective polarization-separation device 7 are replaced by a quarter wave plate 62 and a reflective polarization-separation device 72. In FIG. 6, the devices that are the same as or equivalent to those shown in FIG. 1 are given the same reference characters, and explanation thereof will be omitted.

As shown in FIG. 6, the unidirectionally polarized light, which is obtained by setting the quarter wave plate 62 and the reflective polarization-separation device 72 in the center of the first reflecting mirror 4, makes a light having a rectangular cross section and a specific color for illuminating the light valve after passing through the color wheel 8 and being guided by the optical relay device 9.

The lamp 1 may be more than one in number when it is required to project brighter images. In this case, the window 13 of the second reflecting mirror 3 may not be circular as far as the optical cavity C1 can take in the light with low losses. For example, the window may be oval. Furthermore, the second reflecting mirror 3 may have more than one window.

The first reflecting mirror 4 may have a reflecting surface which is not flat but slightly convexed or cancaved, and the second reflecting mirror 3 may not be a spherical mirror but a parabolic mirror depending on directivity of the lamp as far as the optical cavity C1 can operate as an optical integrator.

Furthermore, each of the first reflecting mirror 4 and the second reflecting mirror 3 maybe comprised of more than one mirrors. There are some cases where the illumination optical system can be manufactured at low cost by constituting such a reflecting mirror by a plurality of mirrors easy to manufacture depending on the shape of the window allowing the light from the lamp to pass and the number of such windows.

As explained above, the optical illuminating system 52 according to embodiment 2 has the advantage that the projection-type display apparatus can be made even smaller in size than the optical illuminating system 51 according to embodiment 1 since the optical illuminating system 52 does not include the columnar optical device.

Embodiment 3

Figure 7:
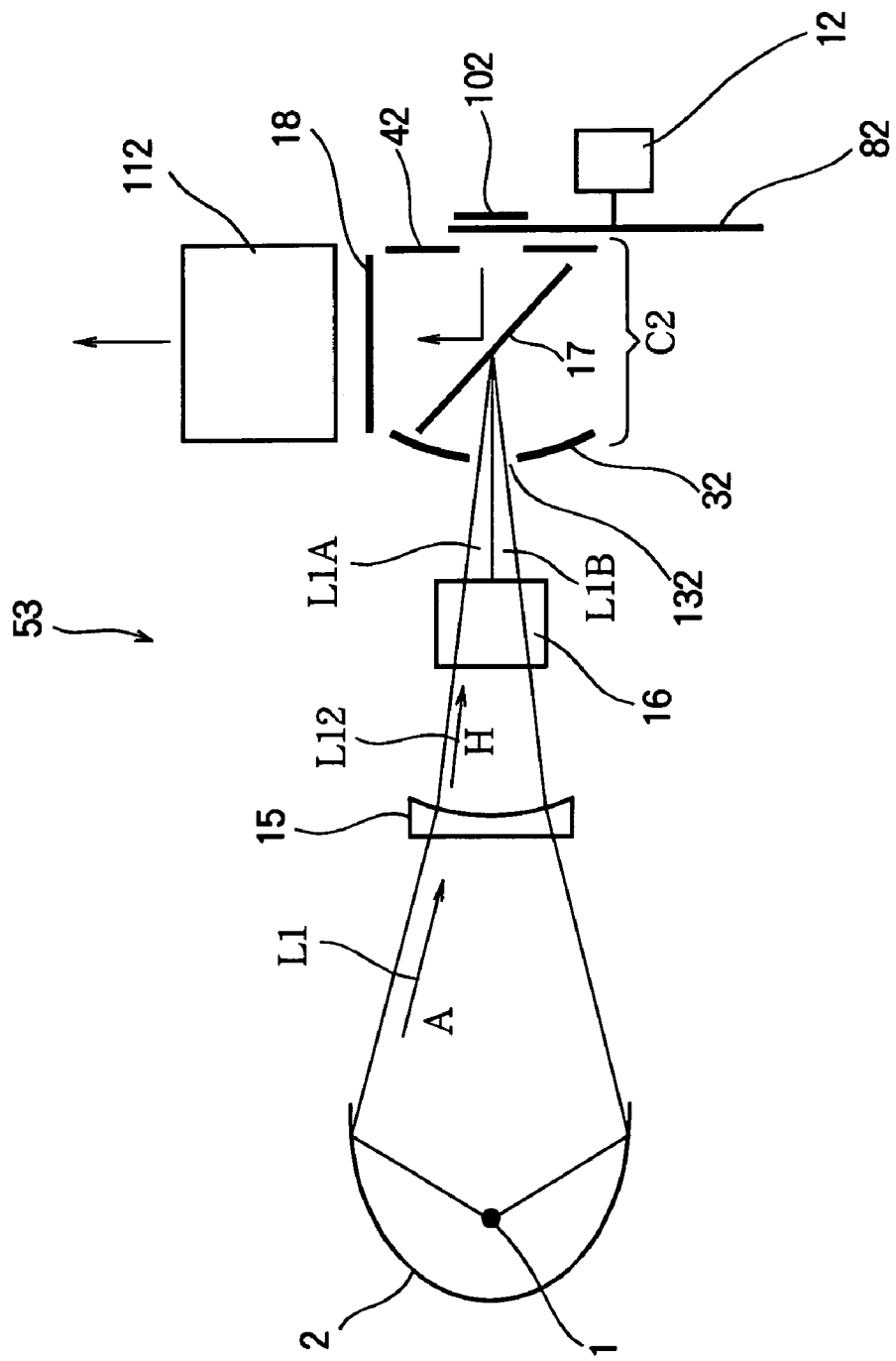
FIG. 7 shows a structure of an illumination optical system according to embodiment 3 of the invention.

FIG. 7 shows a structure of an illumination optical system 53 according to embodiment 3 of the present invention.

The illumination optical system 53 has a lamp 1 as a light source, and a lamp-side reflecting mirror 2 disposed near the lamp 1. A lens 15, a polarization converter 16, a second reflecting mirror 32, a reflective polarization-separation device 17, a first reflecting mirror 42, a color wheel 82, a reflective liquid-crystal light valve 102, an analyzer 18, and a projection lens 112 are disposed in this order from the lamp 1 along an optical path of the light reflected from the lamp-side reflecting mirror 2.

An overall operation of the illumination optical system 53 having the above-described structure is explained below. The arrow A denotes a direction of movement of the light L1 reflected from the lamp-side reflecting mirror 2. The lens 15 receives the light L1, and emits it as a light L12 moving in the direction shown by the arrow H toward the polarization converter 16. The polarization converter 16, which forms a unidirectionally-polarized light output means, receives the light L1 which is a natural light, and outputs two light beams L1A and L1b having the same polarization direction toward a window 132 of the second reflecting mirror 32.

Figure 8:
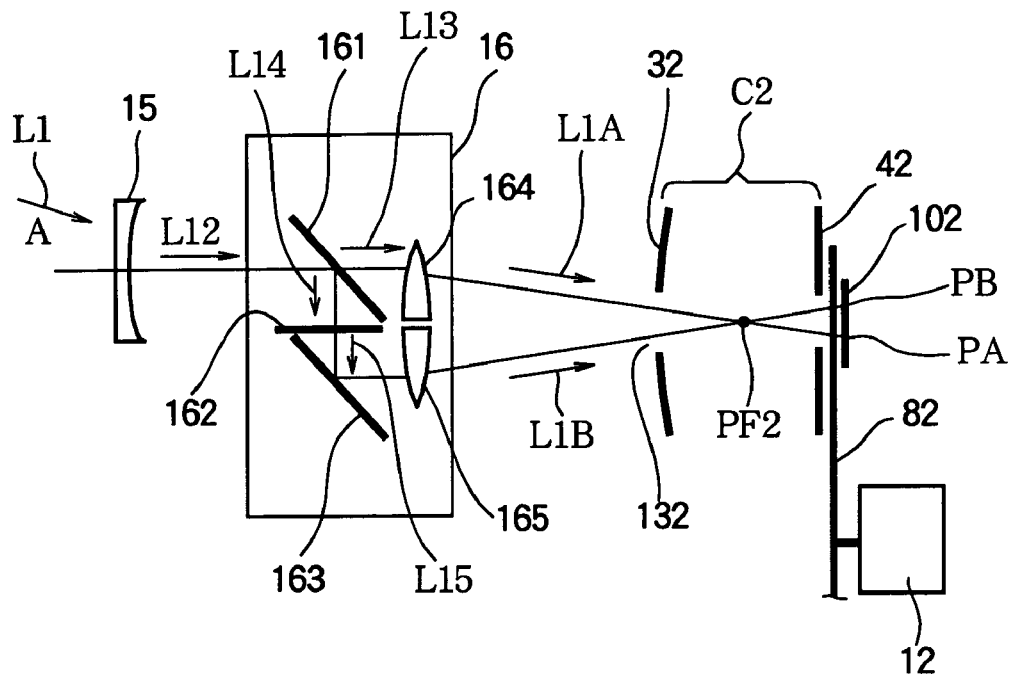
FIG. 8 shows a structure of a polarization converter 16 of the illumination optical system shown in FIG. 7 and optical paths around the polarization converter.

FIG. 8 is a partially enlarged view showing a structure of the polarization converter 16 and optical paths in its vicinity. As shown in this figure, a reflective polarization-separation device 161 is disposed on the foreside of an optical path within the polarization converter 16. A path running through a condensing lens 164, and a path running through a half-wave plate 162, a mirror 163, and a condensing lens 165 are provided in the rear of the reflective polarization-separation device 161. 132 denotes a window formed in the center of the second reflecting mirror 32, PF2 denotes a convergence point at which the light beam L1A and the light beam L1B converge, PA denotes a point on the entrance surface of the reflective liquid-crystal valve 102 which the center of the light beam L1A goes into, PB denotes a point on the surface of the reflective liquid-crystal valve 102 which the center of the light beam L1B goes into, and C2 denotes an optical cavity formed by the first reflecting mirror 42 and the second reflecting mirror 32.

The light L12 that has reached the reflective polarization-separation device 161 is split into a linearly polarized light L13 that passes through this device, and a linearly polarized light L14 that is reflected by this device. The light L13 that has passed through the polarization-separation device 161 is condensed by the condensing lens 164, passes through the window 132 and the convergence point PF2, and reaches the reflective liquid-crystal valve 102 with its center coinciding with the point PA as the light beam L1A. On the other hand, the light L14 shifts its polarization direction by 90 degrees when passing through the half-wave plate 162, changes direction when reflected by the mirror 163. Then it is condensed by the condensing lens 165, passes through the window 132 and convergence point PF2, and reaches the reflective liquid-crystal valve 102 with its center coinciding with the point PB as the light beam L1B.

Part of each of the light beams L1A and L1B which is reflected by first reflecting mirror 42 after entering the optical cavity C2 is reflected multiple times within the optical cavity C2 until it goes into the reflective liquid-crystal valve 102.

Figure 9:
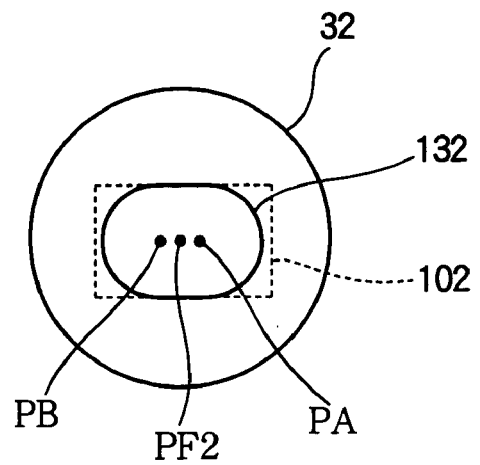
FIG. 9 shows a second reflecting mirror 32 of the illumination optical system shown in FIG. 7 viewed from a lamp 1.

FIG. 9 shows the second reflecting mirror 32 viewed from the lamp side.

As shown in this figure, the entrance surface or light-receiving surface of the reflective liquid-crystal light valve 102 is situated at the back of the oval window 132. The light-receiving surface of the reflective liquid-crystal light valve 102 is rectangular and has an aspect ratio of 16:9 or 4:3. By arranging the points A and B which are center points of the light beams L1A and L1B on a line parallel to the long sides of the light-receiving surface of the reflective liquid-crystal light valve 102, it becomes possible to reduce brightness difference of an projected image in its horizontal direction.

The color wheel 82, which includes spirally arranged segments each of which forms a primary-color-passing dichroic filter, is placed in front of the reflective liquid-crystal light valve 102 at a distance of several millimeters therefrom. The color wheel 82 is driven to rotate by a motor 12 at a rotation speed depending on a frame period of an image to be projected.

Figure 10A:
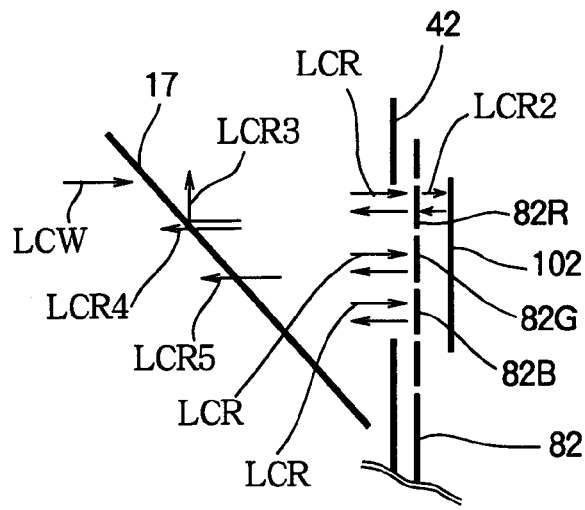
FIG. 10a shows a reflective liquid-crystal light valve 102 of the illumination optical system shown in FIG. 7 and optical paths around the reflective liquid-crystal light valve 102.

FIG. 10a is a partially enlarged view showing the reflective liquid-crystal light valve 102, the color wheel 82, the first reflecting mirror 42, and the reflective polarization-separation device 17 together with optical paths in their vicinity.

In this figure, 82R, 82G and 82B denote segments forming dichroic filters allowing red, green and blue lights respectively. LCW denotes white light moving within the optical cavity C2, LCR denotes red light moving within the optical cavity C2, LCR2 denotes red light that has passed through the red segment 82R, LCR3 denote red light reflected from the reflective polarization-separation device 17, and LCR4 and LCR 5 denote red lights that have passed through the reflective polarization-separation device 17.

The optical cavity C2 (FIG. 8) receives the light beams L1A, L1B as the white light LCW. The reflective polarization-separation device 17 is set so as to allow a light having the same polarization direction as the light LCW to pass and to make an angle of about 45 degrees with the optical axis. The red light LCR included in the white light LCW enters all of the segments 82R, 82G, 82B. The red light LCR passes through only the segment 82R as the light LCR2 going into the reflective liquid-crystal light valve 102.

The reflective liquid-crystal light valve 102 shifts polarization direction of the light LCR2 on a pixel-by-pixel basis to form a red image when reflecting the light LCR2. The reflected red light reaches the reflective polarization-separation device 17, where it is reflected and changes direction to make the light LCR3, if its polarization direction was shifted by the reflective liquid-crystal light valve 102. On the other hand, it passes through the reflective polarization-separation device 17, and moves backward and forward within the optical cavity C2, if its polarization direction was not shifted by the reflective liquid-crystal light valve 102.

The same goes for the green light and the blue light. Thus, the direction of the light to be thrown is changed at the reflective polarization-separation device 17 toward the screen, while the light not to be thrown is reflected repeatedly within the optical cavity C2 so that it is used as an illuminating light. As a result, the loss of the light can be reduced.

Figure 10B:
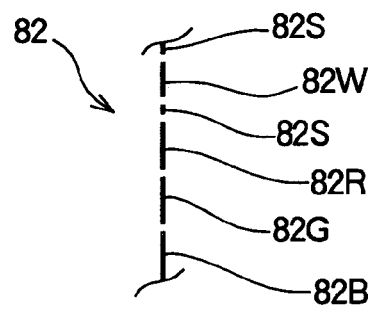
FIG. 10b and FIG. 10c show variants of the color wheel 82.
Figure 10C:
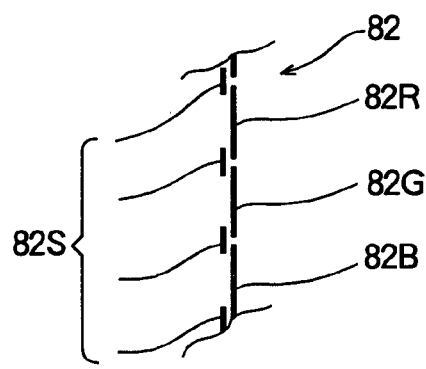

FIG. 10b and FIG. 10c show structures of variants of the color wheel 82.

In the structure shown in FIG. 10b, 82W denotes a transparent segment, and 82S denotes a segment forming a reflective beam splitter as a brightness modulating means having transmittance which is $\frac{1}{16}$ (6.7%) of that of the transparent segment. By projecting pixels having low degree of color saturation and being at high levels in brightness with the white light passing through the transparent segment 82W, it is possible to reduce color shift and blurring of an image of a moving object.

By providing the segment 82S having low transmittance adjacently to the transparent segment 82W, it becomes possible to use the illuminating light exiting from the segment 82S having intensity which is $\frac{1}{16}$ of that of the light exiting from the transparent segment 82W. Accordingly, it becomes possible to increase the number of gradation levels since four extra bits can be used for representing dark part of an image the structure shown in FIG. 10b is suitable for a display apparatus using a reflective liquid-crystal device as a light valve.

In the structure shown in FIG. 10c, the segment 82S having transmittance which is $\frac{1}{16}$ (6.7%) of that of the transparent segment is provided across a glass plate (not shown) from the segments 82R, 82G, 82B. Accordingly, the illuminating light having intensity reduced by a factor of 16 is produced for each color, so tone reproduction can be improved for a dark area of an image to be projected.

According to human visual characteristic, it is desirable that the number of projections of an image per TV frame is between one and three for each primary color, however, in the case of projecting a still image or computer graphics, since it is not restricted to such values. So, the rotation speed of the color wheel should be determined depending on the response speed of the light valve and the type of an image to be projected.

The illumination optical system 53 according to embodiment 3 is suitable for a display apparatus using a reflective liquid-crystal device as a light valve, since the reflective polarization-separation device 17 is be set at an angle to the optical axis within the optical cavity C2. With the illumination optical system 53, it is possible to provide a projection-type display apparatus small in size, since the light to be thrown and the light not to be thrown can be separated within the optical cavity.

Furthermore, the illumination optical system 53 according to embodiment 3 is suitable for illuminating a wide-width light valve having, for example, an aspect ratio of 16:9, since the light valve is irradiated by two light beams whose centers are displaced from each other in the direction parallel to the long sides of the entrance surface of the light valve thereby reduce brightness difference of an projected image in its horizontal direction.

Embodiment 4

FIG. 11 shows a structure of a polarization converter 160 included in an illumination optical system according to embodiment 4 of the invention.

This polarization converter 160, which forms a unidirectionally-polarized light output means, can be used in the illumination optical system 53 according to embodiment 3 in place of the polarization converter 16. Since the parts in front and in the rear of the polarization converter 160 of the illumination optical system according to embodiment 4 are the same as those of the illumination optical system 53 according to embodiment 3, embodiment 4 will be explained with reference to FIG. 7.

However, since the light beam output from the polarization converter 160 moves in the direction perpendicular to the plane of FIG. 7, it is assumed that the second reflecting mirror 32 and the subsequent devices placed in the rear of the polarization converter 160 are arranged along this direction maintaining their physical relationship.

Figure 11A:
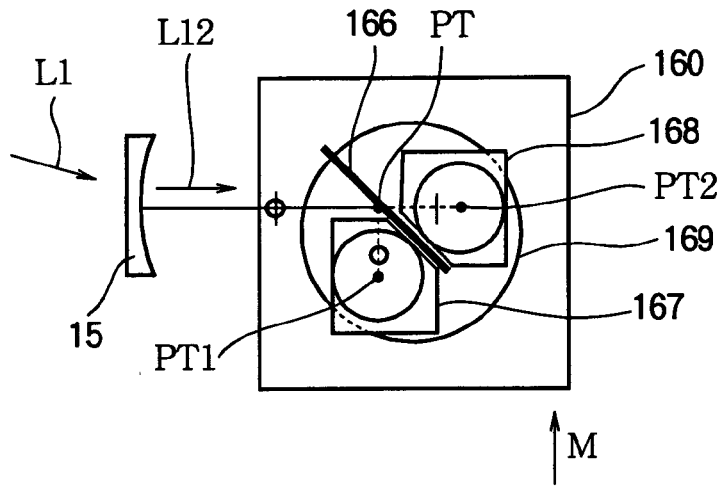
FIGS. 11a, 11b, 11c show a structure of a polarization converter 160 of an illumination optical system according to embodiment 4 of the invention.
Figure 11B:
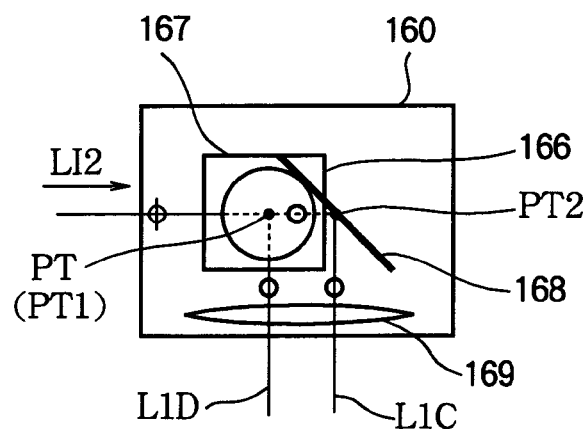
Figure 11C:
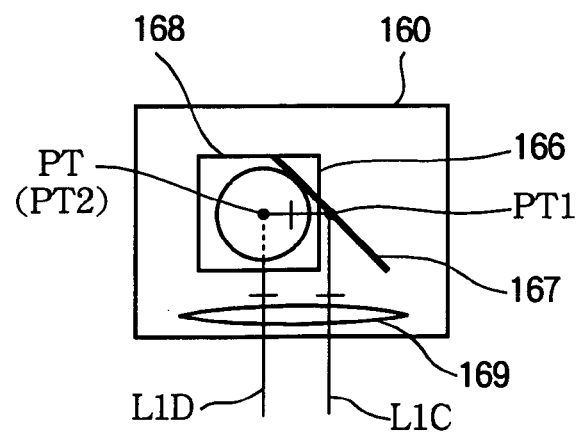

FIG. 11a shows the polarization converter 160 viewed from above as with FIG. 7, FIG. 11b shows the polarization converter 160 viewed along the direction shown by the arrow M, and FIG. 11c shows the polarization converter 160 viewed from the lamp 1.

As shown in FIG. 11a and FIG. 11b, a path running through a mirror 167 and a path running through a mirror 168 are provided side by side in the rear of the reflective polarization-separation device 166 which is formed by fine metal wires (wire grid) within the polarization converter 160 PT, PT1, and PT2 denote points at which the optical axis intersects the reflective polarization-separation device 166, the mirror 167 and the mirror 168 respectively. L1 denotes a first light beam equivalent to the light beam L1A in FIG. 7, and L1D denotes a second light beam equivalent to the light beam L1B in FIG. 7 Each of the line segments on the optical axis indicates that the direction of vibration of a light beam concerned is parallel to the plane of FIG. 11a, 11b, or 11c, and each of the white circles on the optical axis indicates that the direction of vibration of a light beam concerned is perpendicular to the plane of FIG. 11a, 11b, or 11c.

As shown in FIG. 11a, nearly-collimated natural light entering the polarization converter 160 as the light L12 goes into the reflective polarization-separation device 166 with its center coinciding with the point PT. A component of the light L12 having polarization direction (direction of vibration of electric field) parallel to the plane of FIG. 11a at the point PT passes through the reflective polarization-separation device 166 and reaches the mirror 168. On the other hand, the other component having polarization direction perpendicular to the plane of FIG. 11a at the point PT is reflected by the reflective polarization-separation device 166 and makes approximately a right-angled turn to reach the mirror 167. At each of the points PT1 and PT2, the light input thereto changes direction to move perpendicularly to the plane of FIG. 11a.

As shown in FIG. 11b, the polarization directions of the lights reflected by the mirror 167 and the mirror 168 respectively are the same and perpendicular to the plane of FIG. 11b. These lights pass through the lens 169 to make the light beams L1C and L1D moving toward the window 132 of the optical cavity C2.

The direction of movement of the light beams L1C and L1D are different from those of the light beams L1A and L1D. Accordingly, arrangement of the lamp 1, the lamp-side reflecting mirror 2 and the polarization converter 160, and setting of the devices placed in the rear of the polarization converter 160 should be made differently so that the two light beams enter the optical cavity C2. Likewise, the reflective polarization-separation device 17 and the reflective liquid-crystal light valve 102 should be brought in an appropriate orientation to separate the light beam to be thrown from the light beam not to be thrown within the optical cavity C2 in consideration of direction of movement of the light beams L1C and L1D.

As explained above, the illumination optical system 53 according to embodiment 4 can perform the polarization conversion with high stability irrespective of its simple structure, since the polarization converter 160 thereof does not use any glass prism and any quarter wave or half-wave plate.

Embodiment 5

FIG. 12 shows a structure of an illumination optical system 55 according to embodiment 5 of the invention.

The illumination optical system 55 has a lamp 1 as a light source, and a lamp-side reflecting mirror 2 disposed near the lamp 1. A lens 15, a light shutter 201, a polarization converter 16, a second reflecting mirror 33, a reflective polarization-separation device 17, a cross prism 20, first reflecting mirrors 43R, 43G, 43B, reflective liquid-crystal light valves 103R, 103G, 103B for forming red, green and blue light images respectively, an analyzer 18 and a projection lens 113 are disposed in this order from the lamp 1 along an optical path of the light reflected from the lamp-side reflecting mirror 2.

A light shutter driving circuit 202 for driving the light shutter 201 which serves as a light intensity changing means is controlled by a control circuit 207. A light sensor 203 senses light intensity and outputs light information to the control circuit 207. Light valve driving circuits 204R, 204G, 204B for driving the reflective liquid-crystal light valves 103R, 103G, 103B receive image information from a signal processing circuit 205 which processes an image signal input to a signal receiving section 206 under control of the control circuit 207. The signal processing circuit 205 and the control circuit 207 form a light modulating means. The light shutter driving circuit 202 and the control circuit 207 form a light intensity control means.

An focal point (not shown) of the second reflecting mirror 33 which is a spherical reflecting mirror exists in the rear of the reflective liquid-crystal light valves 103R, 103G, 103B virtually. The second reflecting mirror 33 has a window formed in the center thereof to allow a white unidirectionally polarized light to pass therethrough.

The cross prism 20 has a dichroic filter as an interface at which the red light and the blue light make a right-angled turn and through which the green light passes. As for the green light, the first reflecting mirror 43G and the second reflecting mirror 33 form an optical cavity to illuminate the reflective liquid-crystal light valve 103G. The light modulated by the reflective liquid-crystal light valve 103G passes through the cross prism 20, changes direction at the reflective polarization-separation device 17, passes the analyzer 18 and goes into the projection lens 113.

The blue light and the red light are also modulated in accordance with an image to be projected as with the green light, though their directions are not changed by the cross prism 20. Thus, a full color image is projected by combining the three different color images.

In FIG. 12, the reference characters identical to those in FIG. 7 showing the illumination optical system 53 according to embodiment 3 represent the same elements. In this embodiment, the optical cavity is formed by a combination of the second reflecting mirror 33 and the first reflecting mirror 43R for red light, by a combination of the second reflecting mirror 33 and the first reflecting mirror 43G for green light, and by a combination of the second reflecting mirror 33 and the first reflecting mirror 43B for blue light.

The operation of the projection-type display apparatus 55 having the above-described structure will be explained in detail below. An image signal such as a TV signal is input to the signal processing circuit 205 through the signal receiving section 206. The signal processing circuit 205 applies brightness correction, color-tone correction, etc. to the image signal, converts the corrected image signal to a frame-switching signal suitable for use in the light valve for each color, and then outputs it to the light valve driving circuits 204R, 204G, 204B. The light valve driving circuits 204R, 204G, 204B drive the reflective liquid-crystal light valves 103R, 103G, 03B which modulate the received red, green and blue lights respectively.

The volumes of the red, green and blue lights may differ from one another depending on an image to be projected. In consequence, the intensities of the red, green and blue lights illuminating the red, green and blue light valves may differ from one another when the light not to be thrown is reused. Accordingly, the light sensor 203 disposed within the optical cavity senses the intensities of the red, green and blue lights, and outputs signals indicative of the sensed intensities to the control circuit 207. For example, if the intensity of the blue light is detected to be larger than the other colors, the control circuit 207 instructs the signal processing circuit 205 to reduce the intensity level of the blue light by outputting a control signal to the signal processing circuit 205. The signal processing circuit 205 output corrected signals to the light valve driving circuits 204R, 204G, 204B, whereby the light valve 103B reflects less light than the other light valves.

When an image to be projected is dark as a whole, the volume of the light recaptured within the optical cavity becomes large for each color. When the volume of the light recaptured within the optical cavity becomes large and the intensity of the light illuminating the light valve therefore increases, a black level of an image may rise undesirably, since the light valve cannot block the light completely.

The control circuit 207 upon receiving, from the sensor 23, a signal indicative of the intensity of the light within the optical cavity being higher than a predetermined level for each of the primary colors, instructs the shutter driving circuit 202 to reduce the intensity of the light by outputting a control signal to the shutter driving circuit 202, whereby the shutter 201 reduces opening thereof. The shutter 201 may be a mechanical shutter or an electronic shutter using a liquid-crystal device or the like.

The structure of the projection-type display apparatus of the invention is not limited to the structure of embodiment 5. For example, the shutter 201 may be placed in a different position. It is permissible to place the shutter 201 between the lamp 1 and the lens 15, between the polarization converter 16 and the optical cavity, or within the optical cavity. Although the sensor 203 is disposed within the optical cavity in embodiment 5, it is permissible to place the sensor 203 in the vicinity of each of the light valves 103R, 103G, and 103B.

Although the arrangement in which one reflective polarization-separation device 17 and one cross prism are disposed between three first reflecting mirrors 43R, 43G, 43B and one second reflecting mirror 33 is used for embodiment 5, it is needless to say that different arrangement is possible. For example, it is possible to dispose three optical cavities in the rear of one cross prism with a polarization-separation means being placed between the cross prism and the optical cavities. Furthermore, the light valve does not necessarily have to be a liquid-crystal valve. For example, it may be a micro mirror device. In this case, the polarization converter 16 is removed, and the polarization-separation device 17 is replaced by a total-internal-reflection prism.

As explained above, with the projection-type display apparatus according to embodiment 5, color balance and tone continuity in a dark part of a projected image can be kept in good condition. Furthermore, the projection-type display apparatus according to embodiment 5 can keep black level from rising even when projecting a dark image, so high quality image with no artificiality can be obtained.

The above explained preferred embodiments are exemplary of the invention of the present application which is described solely by the claims appended below. It should be understood that modifications of the preferred embodiments may be made as would occur to one of skill in the art.

What is claimed is:

1. An illumination optical system for guiding a light emitted from a light source to an object to be illuminated along an optical path comprising:
   a first reflecting mirror reflecting a part of a light which is moving in a forward direction along the optical path to move away from the light source; and
   a second reflecting mirror, disposed entirely between the light source and the first reflecting mirror, reflecting a part of a light which is reflected from the first reflecting mirror and moving in a reverse direction along the optical path to approach the light source;
   wherein the first reflecting mirror has an opening that allows the other part of the light moving in the forward direction to pass therethrough and reach the object to be illuminated, and the second reflecting mirror has a window that allows the light emitted from the light source to pass therethrough, whereby an optical cavity is constituted by reflecting surfaces of the first and second reflecting mirrors that substantially face each other and cause light waves to resonate therebetween.

2. An illumination optical system according to claim 1, in which shapes of reflecting surfaces of the first and second reflecting mirrors and an alignment between the first and second reflecting mirrors are such as to enable the optical cavity to confine an illuminating light therein with which the object is illuminated.

3. An illumination optical system according to claim 2, in which the first reflecting mirror is a plane mirror, the second reflecting mirror is a spherical mirror the reflecting surface of which faces the reflecting surface of the first reflecting mirror, the opening of the first reflecting mirror is formed in approximately a center of the first reflecting mirror, and the window of the second reflecting mirror is formed in approximately a center of the second reflecting mirror.

4. An illumination optical system according to claim 3, in which a focal point of the second reflecting mirror is situated in the rear of a light-entering surface of the object to be illuminated when viewed from the second reflecting mirror.

5. An illumination optical system according to claim 1, further comprising a light source for emitting a divergent light, and a light-collecting device for collecting the divergent light into the optical cavity through the window.

6. An illumination optical system according to claim 1, in which the object to be illuminated includes a reflective optical device.

7. An illumination optical system according to claim 1, in which the object to be illuminated allows a light moving in the reverse direction along the optical path within the object and to enter the optical cavity from the light-entering surface thereof.

8. An illumination optical system according to claim 1, further comprising a phase plate disposed in the optical path.

9. An illumination optical system according to claim 1, in which the object to be illuminated is a light valve, and the optical illumination optical system further comprises a light sensor for sensing intensity of a light in the optical path or the optical cavity, and a control device for controlling degree of light modulation on polarization direction in the light valve in accordance with the intensity sensed by the light sensor.

10. An illumination optical system according to claim 1, further comprising a light sensor for sensing intensity of a light in the optical path or the optical cavity, a light shutter having a variable opening which the light emitted from the light source passes through, and a light intensity control device that controls opening of the light shutter in accordance with the intensity sensed by the light sensor.

11. An illumination optical system for guiding a light emitted from a light source to an object to be illuminated along an optical path comprising:
a first reflecting mirror reflecting a part of a light which is moving in a forward direction along the optical path to move away from the light source;
a second reflecting mirror reflecting a part of a light which is reflected from the first reflecting mirror and moving in a reverse direction along the optical path to approach the light sources,
wherein the first reflecting mirror has an opening that allows the other part of the light moving in the forward direction to pass therethrough and reach the object to be illuminated, and the second reflecting mirror has a window that allows the light emitted from the light source to pass therethrough, whereby an optical cavity is constituted by reflecting surfaces of the first and second reflecting mirrors that substantially face each other and cause light waves to resonate therebetween; and
a quarter wave plate and a reflective polarization separation device disposed within the optical cavity at right angles to the axis of the optical path.

12. An illumination optical system for guiding a light emitted from a light source to an object to be illuminated along an optical path comprising:
a first reflecting mirror reflecting a part of a light which is moving in a forward direction along the optical path to move away from the light source;
a second reflecting mirror reflecting a part of a light which is reflected from the first reflecting mirror and moving in a reverse direction along the optical path to approach the light source,
wherein the first reflecting mirror has an opening that allows the other part of the light moving in the forward direction to pass therethrough and reach the object to be illuminated, and the second reflecting mirror has a window that allows the light emitted form the light source to pass therethrough, whereby an optical cavity is constituted by the first and second reflecting mirrors,
a reflective polarization separator is disposed within the optical cavity at an angle to an axis of the optical path, and
a dichroic filter device is disposed within the optical cavity at an angle to the axis of the optical path.

13. An illumination optical system according to claim 12, further comprising a unidirectionally-polarized light generator that receives the light emitted from the light source and generates a unidirectionally-polarized light to be input to the optical cavity through the window.

14. An illumination optical system according to claim 13, in which the unidirectionally-polarized light generator includes: a reflective polarization-separation device for separating the light emitted from the light source into a first polarized light having a first polarization direction and a second polarized light having a second polarization direction perpendicular to the first polarization direction, a polarization-direction shifting device for shifting the polarization direction of the second polarized light by 90 degrees to make a third polarized light having the first polarization direction, and a condensing device guiding the first and the third polarized lights to the optical cavity.

15. An illumination optical system according to claim 14, in which the unidirectionally-polarized light generator includes: a reflective polarization-separation device for separating the light emitted from the light source into a first polarized light having a first polarization direction and a second polarized light having a second polarization direction perpendicular to the first polarization direction, a mirror having the first polarized light and the second polarized light make approximately a right-angled turn in order to make a third polarized light and a fourth polarized light each of which is moving in a direction perpendicular to a direction of movement of the first polarized light and a direction of movement of the second polarized light, and a condensing device guiding the third and fourth polarized lights to the optical cavity.

16. An illumination optical system according to claim 14, in which the object to be illuminated is a light valve whose light-entering surface is rectangular, the light-receiving surface being irradiated with the first and third polarized lights with centers of the first and the third polarized lights being displaced from each other in a direction parallel to long sides of the light-entering surface.

17. An illumination optical system according to claim 15, in which the object to be illuminated is a light valve whose light-entering surface is rectangular, the light-entering surface being irradiated with the third and fourth polarized lights with centers of the third and fourth polarized lights being displaced from each other in a direction parallel to long sides of the light-entering surface.

18. A projection-type display apparatus having an illumination optical system for guiding a light emitted from a light source to an object to be illuminated along an optical path, and a projection lens for projecting a light exiting from the object onto a screen, the object having light-modulating function, the illumination optical system comprising:
a first reflecting mirror reflecting a part of a light which is moving in a forward direction along the optical path to move away from the light source; and
a second reflecting mirror, disposed entirely between the light source and the first reflecting mirror, reflecting a part of a light which is reflected from the first reflecting mirror and moving in a reverse direction along the optical path to approach the light source;
wherein the first reflecting mirror has an opening that allows the other part of the light moving in the forward direction to pass therethrough and reach the object to be illuminated, and the second reflecting mirror has a window that allows the light emitted from the light source to pass therethrough, whereby an optical cavity is constituted by reflecting surfaces of the first and second reflecting mirrors that substantially face each other and cause light waves to resonate therebetween.

* * * * *